United States Patent
Gallina (10) Patent No.: US 9,471,071 B2
(45) Date of Patent: Oct. 18, 2016

(54) APPARATUS, SYSTEM AND METHOD FOR VOLTAGE REGULATOR WITH AN IMPROVED VOLTAGE REGULATION USING A REMOTE FEEDBACK LOOP AND FILTER

(71) Applicant: Dialog Semiconductor GmbH, Kirchheim/Teck-Nabern (DE)

(72) Inventor: Pietro Gallina, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 212 days.

(21) Appl. No.: 14/204,035

(22) Filed: Mar. 11, 2014

(65) Prior Publication Data
US 2015/0253790 A1    Sep. 10, 2015

(30) Foreign Application Priority Data
Mar. 5, 2014 (EP) .................................... 14368018

(51) Int. Cl.
G05F 1/46 (2006.01)
G05F 1/575 (2006.01)
H02M 3/156 (2006.01)

(52) U.S. Cl.
CPC ................ *G05F 1/46* (2013.01); *G05F 1/575* (2013.01); *H02M 3/156* (2013.01)

(58) Field of Classification Search
CPC ............ G05F 1/46; G05F 1/462; G05F 1/56; G05F 1/565; G05F 1/575
See application file for complete search history.

(56) References Cited

U.S. PATENT DOCUMENTS

| | | | |
|---|---|---|---|
| 4,766,363 A * | 8/1988 | Rutter | G05F 1/66 323/239 |
| 5,485,077 A | 1/1996 | Werrbach | |
| 5,770,940 A * | 6/1998 | Goder | G05F 1/565 323/282 |
| 6,580,256 B1 | 6/2003 | Martindale et al. | |
| 7,368,831 B1 | 5/2008 | Boeckmann | |
| 2002/0070717 A1 | 6/2002 | Pellegrino | |
| 2007/0182391 A1 | 8/2007 | Chapuis et al. | |
| 2008/0303496 A1* | 12/2008 | Schlueter | G05F 1/575 323/273 |
| 2009/0134709 A1 | 5/2009 | Sun | |
| 2010/0264844 A1* | 10/2010 | Wang | H05K 1/141 315/291 |
| 2011/0007434 A1 | 1/2011 | Han et al. | |
| 2011/0037445 A1 | 2/2011 | Ting et al. | |
| 2011/0187566 A1* | 8/2011 | Soenen | H03H 17/00 341/110 |
| 2014/0210545 A1* | 7/2014 | Leibowitz | G05F 1/462 327/540 |

OTHER PUBLICATIONS

European Search Report 14368018.9-1807, Mailed: Oct. 16, 2014, Dialog Semiconductor GmbH.

* cited by examiner

*Primary Examiner* — Matthew Nguyen
(74) *Attorney, Agent, or Firm* — Saile Ackerman LLC; Stephen B. Ackerman (57) ABSTRACT

An apparatus, system, and method for a voltage regulator for improved voltage regulation using a remote feedback and remote feedback low pass filter. The system comprises of a power management unit, a remote load point (HOST), an inductor, a filtering capacitor, a printed circuit board (PCB) track output net, a ground connection, a remote feedback line, and a low pass filter (LPF). In this present disclosure, the electrical connection of the remote feedback low pass filter to the output filter capacitor minimizes transient ringing, reduced noise coupling, and improved system stability.

27 Claims, 13 Drawing Sheets

APPARATUS, SYSTEM AND METHOD FOR VOLTAGE REGULATOR WITH AN IMPROVED VOLTAGE REGULATION USING A REMOTE FEEDBACK LOOP AND FILTER

BACKGROUND

1. Field

The disclosure relates generally to voltage regulator circuits and methods and, more particularly, to a low dropout circuit device having improved voltage regulation and a method thereof.

2. Description of the Related Art

Power management unit (PMU) systems utilize voltage regulators to provide a well regulated voltage at the output load. DC-to-DC voltage regulators have different circuit topology, depending on if it is a step-up, or step-down voltage regulator network. DC-to-DC power regulators can include buck converters (e.g. step-down), boost converters (e.g. step-up), buck-buck, and buck-boost regulators. Low dropout (LDO) regulators are a type of voltage regulators used in conjunction with semiconductor devices, integrated circuit (IC), battery chargers, and other applications. Low dropout regulators (LDO) can be used in digital, analog, and power applications to deliver a regulated supply voltage. In voltage regulators, both linear and switch mode, the desired objective is to provide a precise, and well controlled voltage at the load point. A switch mode voltage regulator requires a large filtering capacitor to suppress voltage ripple.

Power management units (PMUs) use low dropout (LDO) regulators to provide good voltage characteristics. In a typical circuit topology, an LDO regulator consists of an error amplifier, pass transistor, and a feedback network contained on a semiconductor chip. The LDO regulator can be defined using bipolar transistors, or metal oxide semiconductor field effect transistors (MOSFETs). For a MOSFET-based implementation, the pass transistor is typically a p-channel MOSFET device. The pass transistor has a MOSFET source connected to voltage $V_{DD}$, and whose MOSFET drain connected to output voltage, $V_{OUT}$, and whose MOSFET gate is connected to the output of error amplifier. The error amplifier has a negative input defined as voltage reference input, $V_{REF}$, and a positive input signal feedback voltage, $V_{FB}$. The feedback network is connected between the p-channel MOSFET output voltage $V_{OUT}$, and ground reference $V_{SS}$. The feedback network 3 can consist of a resistor divider network whose output is the feedback voltage, $V_{FB}$. All of the active and passive elements are integrated onto the semiconductor chip in the low dropout regulator. The pass transistor, the feedback network, the feedback signal line, and the error amplifier are "local" to each other to provide a small component that is low cost.

Figure 1:
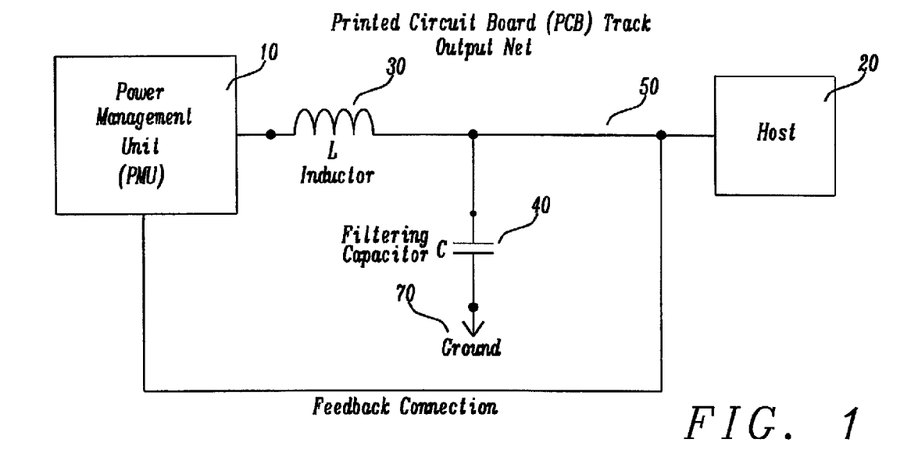
FIG. 1 is a circuit schematic diagram illustrating a prior art embodiment of a Power Management Unit (PMU), remote load (HOST), and system.

As illustrated in FIG. 1, a Power Management Unit (PMU) with a buck-buck voltage regulator is shown. FIG. 1 shows a Power Management Unit (PMU) 10, a remote load point (HOST) 20, an inductor 30, a filtering capacitor 40, a printed circuit board (PCB) track output net 50, a feedback connection 60, and ground connection 70. As illustrated, an inductor 30, and filtering capacitor 40 is connected to the Power Management Unit (PMU) 10 via an electrical connection to the remote load point (HOST) 20. A feedback connection 60 is shown, where a point of the OUTPUT NET track is selected as the feedback for the PMU. It is this location on the OUTPUT NET that the PMU senses for regulating the desired voltage. Due to the non-ideal characteristics of the OUTPUT NET track, the voltage that the PMU senses for regulation is different than the voltage at the remote load point (HOST). In an ideal system, the OUTPUT NET track would have an ideal impedance of zero. In actuality, the OUTPUT NET track is a transmission line, and contains inductive, resistive, and capacitive characteristics. Hence, a voltage drop in the time and frequency domain occurs due to these non-ideal characteristics of the OUTPUT NET track.

Figure 2:
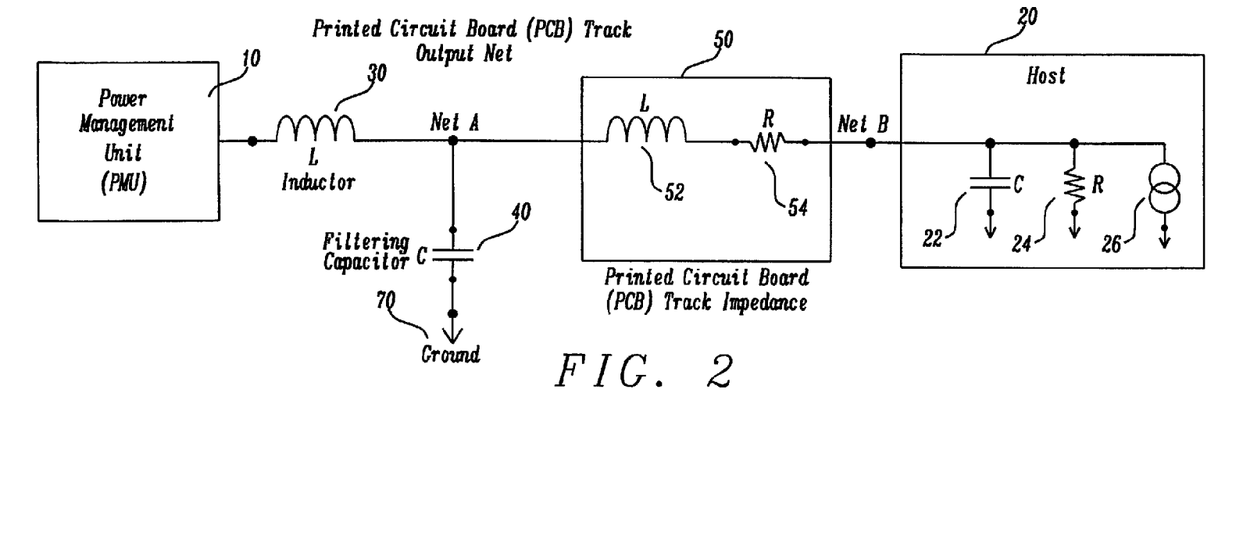
FIG. 2 is a circuit schematic illustrating a prior art embodiment of a Power Management Unit (PMU), remote load (HOST), and system equivalent circuit model.

As illustrated in FIG. 2, an equivalent model can be shown for the electrical network in FIG. 1. As illustrated in FIG. 2, the electrical network can be represented as an equivalent model for a Power Management Unit (PMU) 10, a remote load point (HOST) 20, an inductor 30, a filtering capacitor 40, a printed circuit board (PCB) track output net 50. The equivalent model for the printed circuit board (PCB) track 50 can be represented as an inductor 52, and a resistor 54. The remote load (HOST) 20 can be represented as an equivalent impedance to ground, whose an equivalent circuit comprises of a capacitor 22, a resistor 24, and a current load generator 26.

In operation mode, when the current generator load 26 is driving a current, the voltage on the OUTPUT NET will experience a voltage drop due to the non-ideal characteristics of the printed circuit board (PCB) track 50. This is understood from the equivalent model resistor 54 of the printed circuit board (PCB) track 50. Additionally, a change in the current generator load 26 current magnitude introduces a voltage drop in the PCB track 50 inductor element 52 due to LdI/dt having a non-zero value. If the feedback connection for the remote feedback loop connection 60 is placed closer to the PMU 10 and filtering capacitor 40 (eg. NET A), a "local" feedback is applied. If the feedback connection for the remote feedback is placed closer to the remote load point (HOST) 20 (e.g. Net B), a "remote" feedback is applied. It is a disadvantage to have the feedback connection for the remote feedback loop connection 60 placed closer to the PMU 10 and filtering capacitor 40 (eg. NET A), due to the non-ideal characteristics of the PCB OUTPUT NET track impedance.

Usage of a remote feedback loop has fundamental disadvantages due to the non-ideal impedance characteristics of the printed circuit board (PCB) track. The introduction of these non-ideal characteristics changes the frequency response of the system, and introduce system instability. With the introduction of poles in the system dispersion relationship, a different characteristic response occurs. Additionally, with the remote feedback large loop, the system is more susceptible to noise coupling. This makes the system more susceptible to electromagnetic interference (EMI), and can introduce system-level electromagnetic compatibility (EMC) issues. And lastly, the printed circuit board (PCB) trace parasitic inductance and resistance can interact with the system capacitance elements (e.g. remote load capacitance) leading to RLC oscillation and ringing issues. This can introduce problems for the control circuit.

Figure 3:
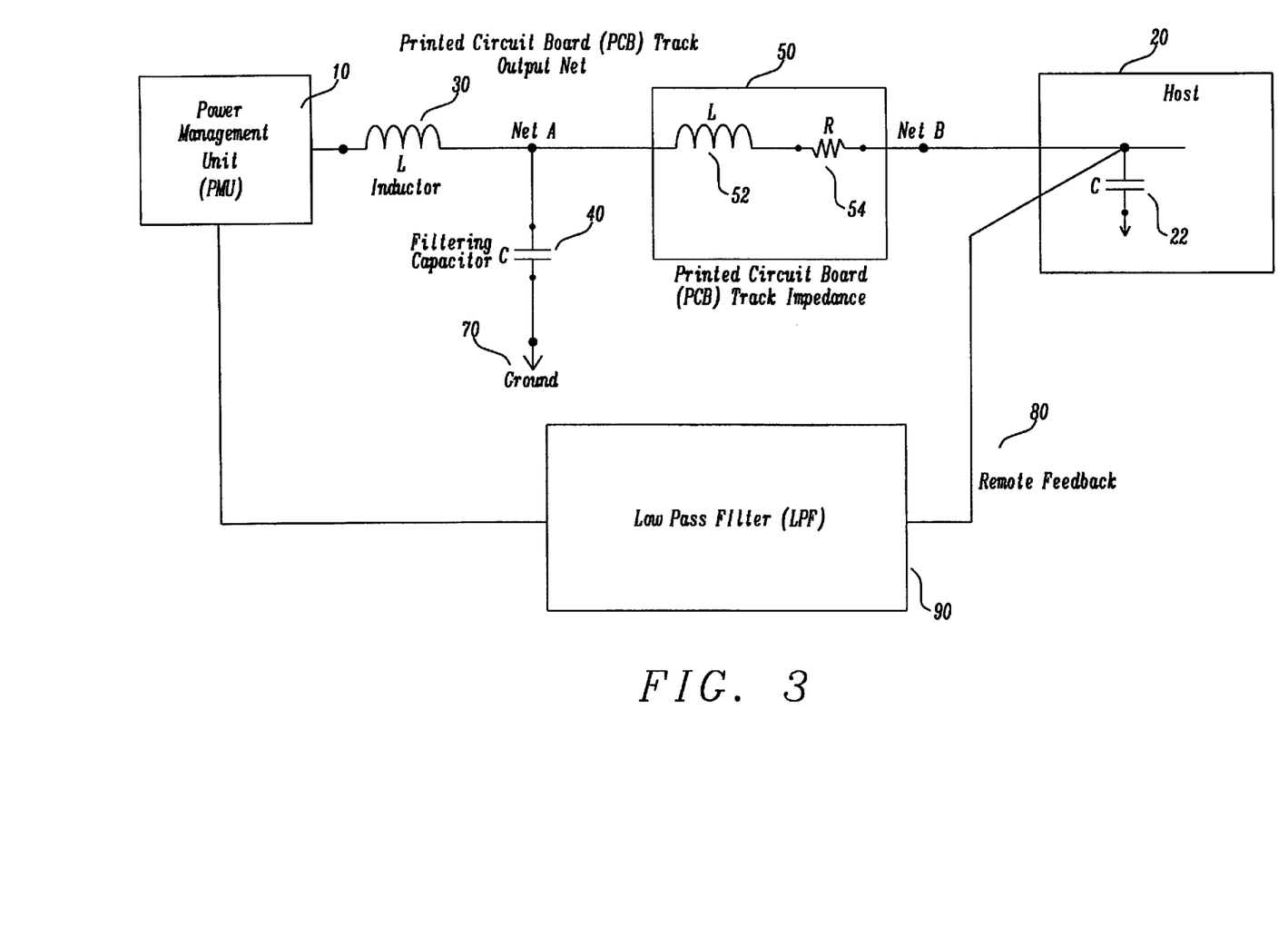
FIG. 3 is a circuit schematic illustrating a prior art embodiment of a Power Management Unit (PMU), remote load (HOST), remote feedback loop, remote feedback low pass filter, and system equivalent circuit model.

Usage of a remote feedback loop due to the non-ideal impedance characteristics of the printed circuit board (PCB) track can be addressed with the introduction of a low pass filter (LPF) on the remote feedback loop. As illustrated in FIG. 3, a low pass filter (LPF) to ground is highlighted on the remote feedback net. As illustrated in FIG. 3, the electrical network can be represented as an equivalent model for a Power Management Unit (PMU) 10, a remote load point (HOST) 20, an inductor 30, a filtering capacitor 40, a printed circuit board (PCB) track output net 50, a ground connection 70, a remote feedback line 80, and a low pass filter (LPF) 90. The equivalent model for the printed circuit board (PCB) track 50 can be represented as an inductor 52, and a resistor 54. The remote load (HOST) 20 can be represented as an equivalent impedance to ground, whose an equivalent circuit comprises of a capacitor 22.

Figure 4:
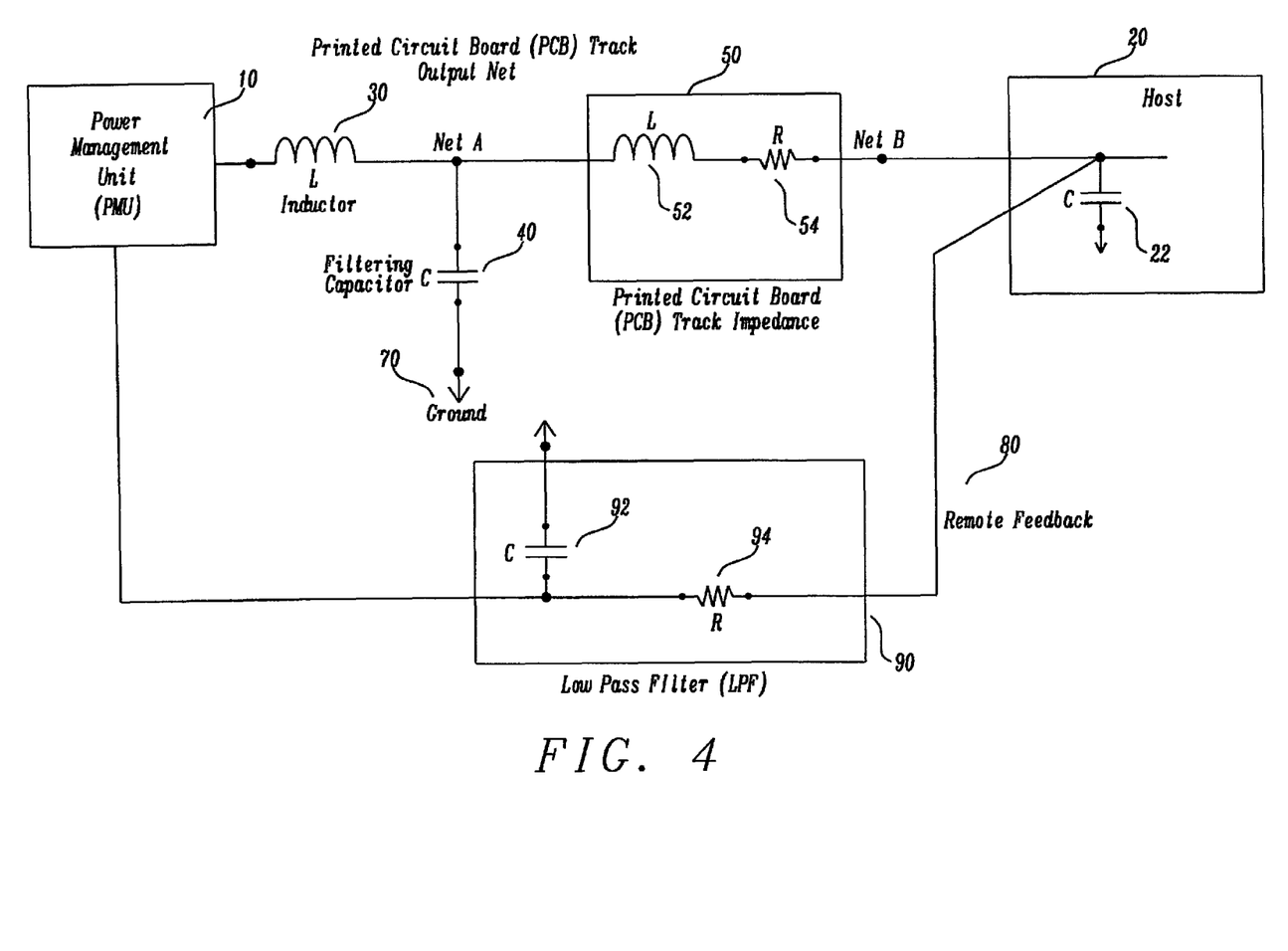
FIG. 4 is a circuit schematic illustrating a prior art embodiment of a Power Management Unit (PMU), remote load (HOST), remote feedback loop, remote feedback low pass RC filter, and system equivalent circuit model.

In the filtering method, a common filter is the RC low pass filter. Usage of a remote feedback loop due to the non-ideal impedance characteristics of the printed circuit board (PCB) track can be addressed with the introduction of a low pass filter (LPF) on the remote feedback loop. As illustrated in FIG. 4, a low pass filter (LPF) to ground is highlighted on the remote feedback net. The electrical network can be represented as an equivalent model for a Power Management Unit (PMU) 10, a remote load point (HOST) 20, an inductor 30, a filtering capacitor 40, a printed circuit board (PCB) track output net 50, a ground connection 70, a remote feedback line 80, and a low pass filter (LPF) 90. The equivalent model for the printed circuit board (PCB) track 50 can be represented as an inductor 52, and a resistor 54. The remote load (HOST) 20 can be represented as an equivalent impedance to ground, whose an equivalent circuit comprises of a capacitor 22. The low pass filter 90 is shown as a capacitor 92, and a resistor element 94.

In this circuit topology, as illustrated in FIG. 4, a problem still exists with the introduction of a "pole" in the circuit frequency response (e.g. in the circuit dispersion relationship). This approach can be effective in preventing the ringing and the noise coupling to the PCB track net, but does not eliminate the modification of the frequency response of the network.

In power converter circuits, the remote load control has been a concern. As discussed in published U.S. Pat. No. 7,368,831 to Boeckmann, describes an apparatus for sensing and controlling remote load voltages, where the apparatus includes a power converter, a plurality of remote loads, where each remote load located in a loop connected to the power converter. A feedback loop connected to the power converter is physically adjacent to the power converter, and said feedback loop comprises of a first and second path where the two paths are in a parallel configuration.

In switching power converters, solutions for remote response has been addressed. As discussed in U.S. Pat. No. 6,580,256 to Martindale et al., a switching power converter discloses a first electrical device, a second electrical device, a differential amplifier, a feedback loop, an adaptive power supply, and a remote sense feedback amplifier.

In boost power converters, apparatus and method of boosting remote nodes have been discussed. As discussed in U.S. Patent Application 2002/0070717 to Pellegrino, discloses an apparatus and method for boosting power supplied to remote nodes shows an amplifier, a remote active boost regulator, a remote sense, and a feedback loop.

In these prior art embodiments, the solution to improve the voltage regulation introduce complexity, cost, and additional circuitry.

SUMMARY

It is an object of the present disclosure to provide a solution that improves the voltage regulation at a remote load.

It is an object of the present disclosure is to provide a voltage regulator circuit configuration solution that is insensitive to printed circuit board track impedances and voltage drops between the power management unit (PMU) and host.

It is an object of the present disclosure to provide a solution that introduces an effective filter on ringing and noise coupled in the remote feedback node.

A principal object of the present disclosure is to provide a improved voltage regulation without introduction of system instability.

A principal object of the present disclosure is to provide a method for achieving a stable system.

These and other objects are achieved by a voltage regulator circuit device with a remote feedback loop and filter, the device comprising a power management unit (PMU), a host load, an inductor, a filtering capacitor, a printed circuit board (PCB) track, a remote feedback loop, and remote feedback loop low pass filter, where the remote feedback loop low pass filter is coupled to the filtering capacitor, and coupled to the power management unit.

These and other objects are achieved with a method of providing system stability in a voltage regulator circuit comprising of the following steps, (1) providing a voltage regulator comprising of a power management unit (PMU), a host load, an inductor, a filtering capacitor, a printed circuit board (PCB) track (also referred to as a PCB trace), a remote feedback loop, and remote feedback loop low pass filter, (2) placing the filtering capacitor adjacent to the power management unit (PMU), (3) coupling the remote feedback loop low pass filter to the filtering capacitor, and coupled to the power management unit, (4) placing the remote feedback loop low pass filter adjacent to the filtering capacitor, (5) placing the remote feedback loop low pass filter adjacent to the power management unit (PMU), optimizing the remote feedback loop low pass filter components that provides optimum system stability.

As such, a novel voltage regulator circuit, system, and method which minimizes sensitivity to noise, transients, ringing and good system stability is desired. Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which.

DETAILED DESCRIPTION

FIG. 1 is a circuit schematic diagram illustrating a prior art embodiment of a Power Management Unit (PMU), remote load (HOST), and system in accordance with a prior art embodiment. As illustrated in FIG. 1, a Power Management Unit (PMU) with a buck-buck voltage regulator is shown. FIG. 1 shows a Power Management Unit (PMU) 10, a remote load point (HOST) 20, an inductor 30, a filtering capacitor 40, a printed circuit board (PCB) track output net 50, a feedback connection 60, and ground connection 70. As illustrated, an inductor 30, and filtering capacitor 40 is connected to the Power Management Unit (PMU) 10 via an electrical connection to the remote load point (HOST) 20. A feedback connection 60 is shown, where a point of the OUTPUT NET track is selected as the feedback for the PMU. It is this location on the OUTPUT NET that the PMU senses for regulating the desired voltage. Due to the non-ideal characteristics of the OUTPUT NET track, the voltage that the PMU senses for regulation is different than the voltage at the remote load point (HOST). In an ideal system, the OUTPUT NET track would have an ideal impedance of zero. In actuality, the OUTPUT NET track can is a transmission line, and contains inductive, resistive, and capacitive characteristics. Hence, a voltage drop in the time and frequency domain occurs due to these non-ideal characteristics of the OUTPUT NET track.

FIG. 2 is a circuit schematic illustrating a prior art embodiment of a Power Management Unit (PMU), remote load (HOST), and system equivalent circuit model in accordance with a prior art embodiment. As illustrated in FIG. 2, the electrical network can be represented as an equivalent model for a Power Management Unit (PMU) 10, a remote load point (HOST) 20, an inductor 30, a filtering capacitor 40, a printed circuit board (PCB) track output net 50. The equivalent model for the printed circuit board (PCB) track 50 can be represented as an inductor 52, and a resistor 54. The remote load (HOST) 20 can be represented as an equivalent impedance to ground, whose an equivalent circuit comprises of a capacitor 22, a resistor 24, and a current load generator 26.

FIG. 3 is a circuit schematic illustrating a prior art embodiment of a Power Management Unit (PMU), remote load (HOST), remote feedback loop, remote feedback low pass filter, and system equivalent circuit model in accordance with a prior art embodiment. As illustrated in FIG. 3., a low pass filter (LPF) to ground is highlighted on the remote feedback net. As illustrated in FIG. 3, the electrical network can be represented as an equivalent model for a Power Management Unit (PMU) 10, a remote load point (HOST) 20, an inductor 30, a filtering capacitor 40, a printed circuit board (PCB) track output net 50, a ground connection 70, a remote feedback line 80, and a low pass filter (LPF) 90. The equivalent model for the printed circuit board (PCB) track 50 can be represented as an inductor 52, and a resistor 54. The remote load (HOST) 20 can be represented as an equivalent impedance to ground, whose an equivalent circuit comprises of a capacitor 22. In this prior art embodiment, use of the remote feedback is more susceptible to noise which is coupled due to the remote feedback loop. This can be improved with filtering. But, the system can be more unstable, as a result of introduction of frequency poles in the frequency domain.

FIG. 4 is a circuit schematic illustrating a prior art embodiment of a Power Management Unit (PMU), remote load (HOST), remote feedback loop, remote feedback low pass RC filter, and system equivalent circuit model in accordance with a prior art embodiment. As illustrated in FIG. 4., a low pass filter (LPF) to ground is highlighted on the remote feedback net. The electrical network can be represented as an equivalent model for a Power Management Unit (PMU) 10, a remote load point (HOST) 20, an inductor 30, a filtering capacitor 40, a printed circuit board (PCB) track output net 50, a ground connection 70, a remote feedback line 80, and a low pass filter (LPF) 90. The equivalent model for the printed circuit board (PCB) track 50 can be represented as an inductor 52, and a resistor 54. The remote load (HOST) 20 can be represented as an equivalent impedance to ground, whose an equivalent circuit comprises of a capacitor 22. The low pass filter 90 is shown as a capacitor 92, and a resistor element 94. In this prior art embodiment, use of the remote feedback is more susceptible to noise which is coupled due to the remote feedback loop. This can be improved with RC filter configuration as illustrated in FIG. 4. But, the system can be more unstable, as a result of introduction of frequency poles in the frequency domain.

Figure 5:
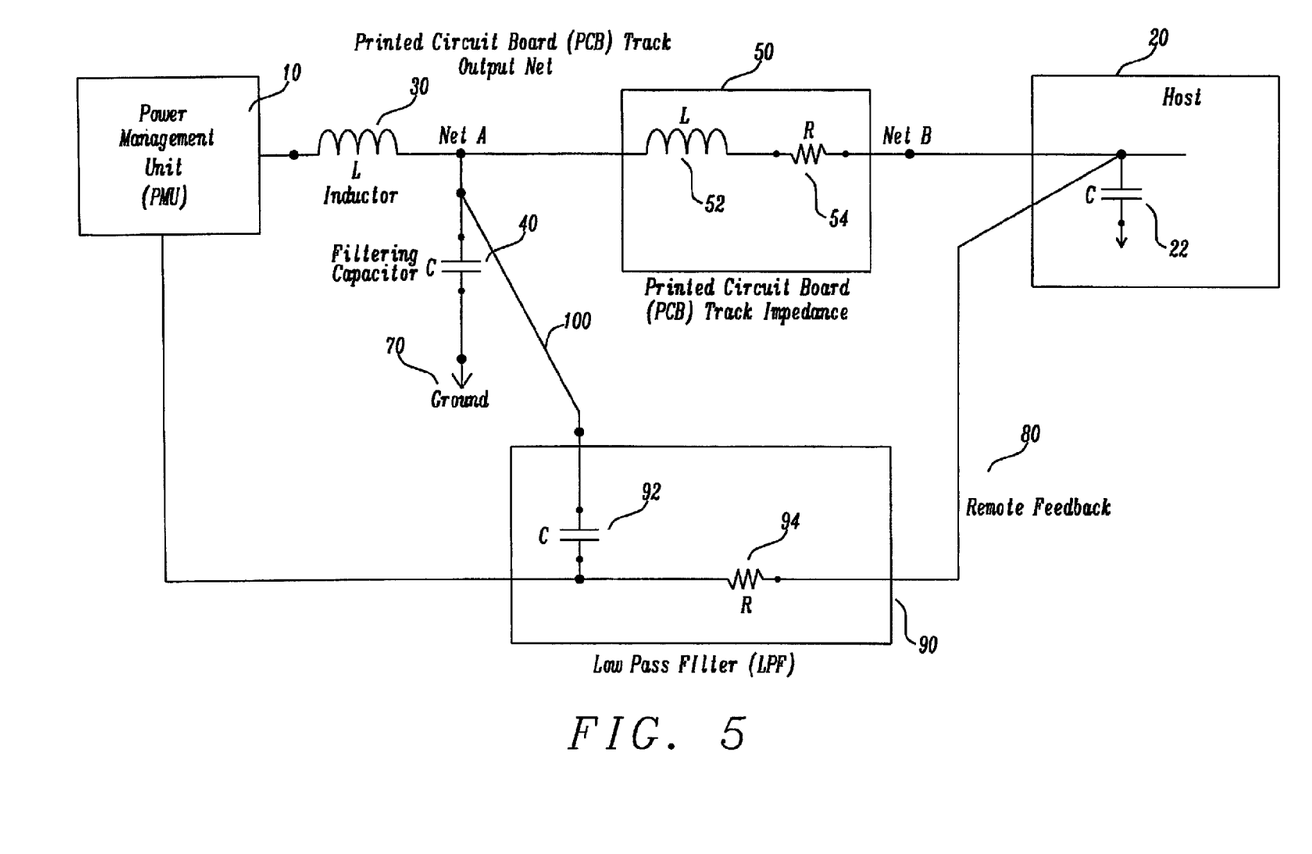
FIG. 5 is a circuit schematic illustrating a first embodiment of the present disclosure of a Power Management Unit (PMU), remote load (HOST), remote feedback loop, remote feedback low pass RC filter, and system highlighting the coupling of the remote feedback loop feedback low pass filter to the filtering capacitor.

FIG. 5 is a circuit schematic illustrating a first embodiment of the present disclosure of a Power Management Unit (PMU), remote load (HOST), remote feedback loop, remote feedback low pass RC filter, and system highlighting the coupling of the remote feedback loop feedback low pass filter to the filtering capacitor. As illustrated in FIG. 5, the electrical network can be represented as a Power Management Unit (PMU) 10, a remote load point (HOST) 20, an inductor 30, a filtering capacitor 40, a printed circuit board (PCB) track output net 50, a ground connection 70, a remote feedback line 80, and a low pass filter (LPF) 90. The equivalent model for the printed circuit board (PCB) track 50 can be represented as an inductor 52, and a resistor 54. The remote load (HOST) 20 can be represented as an equivalent impedance to ground, whose an equivalent circuit comprises of a capacitor 22. The low pass filter 90 is shown as a RC low pass filter formed with capacitor 92, and a resistor element 94. In this embodiment, the electrical connection of the capacitor element 92 is connected at the node of the filter capacitor 40. Instead of the low pass filter be connected to ground (e.g. as is shown in prior art FIG. 4), the low pass filter 90 is connected to the output capacitor element 40. In this preferred embodiment, the advantage of the circuit topology with this electrical connection between the low pass filter 90 and the filtering capacitor 40 is that it provides an effective filter which mitigates and minimizes ringing and noise coupling introduced in the remote feedback node. In this preferred embodiment, the advantage of the circuit topology with this electrical connection between the low pass filter 90 and the filtering capacitor 40 is that it also does not introduce system instability. The explanation and reason of why this is an advantage is that with this electrical connection between the low pass filter 90 and the filtering capacitor 40 a high frequency path is introduced. The high frequency path is established for the remote loop to the filtering capacitor. This kind of connection is also applicable if the ground impedance between the PMU and HOST is a non-ideal ground plane. Additionally, the filter can be a passive filter or an active filter.

Figure 6:
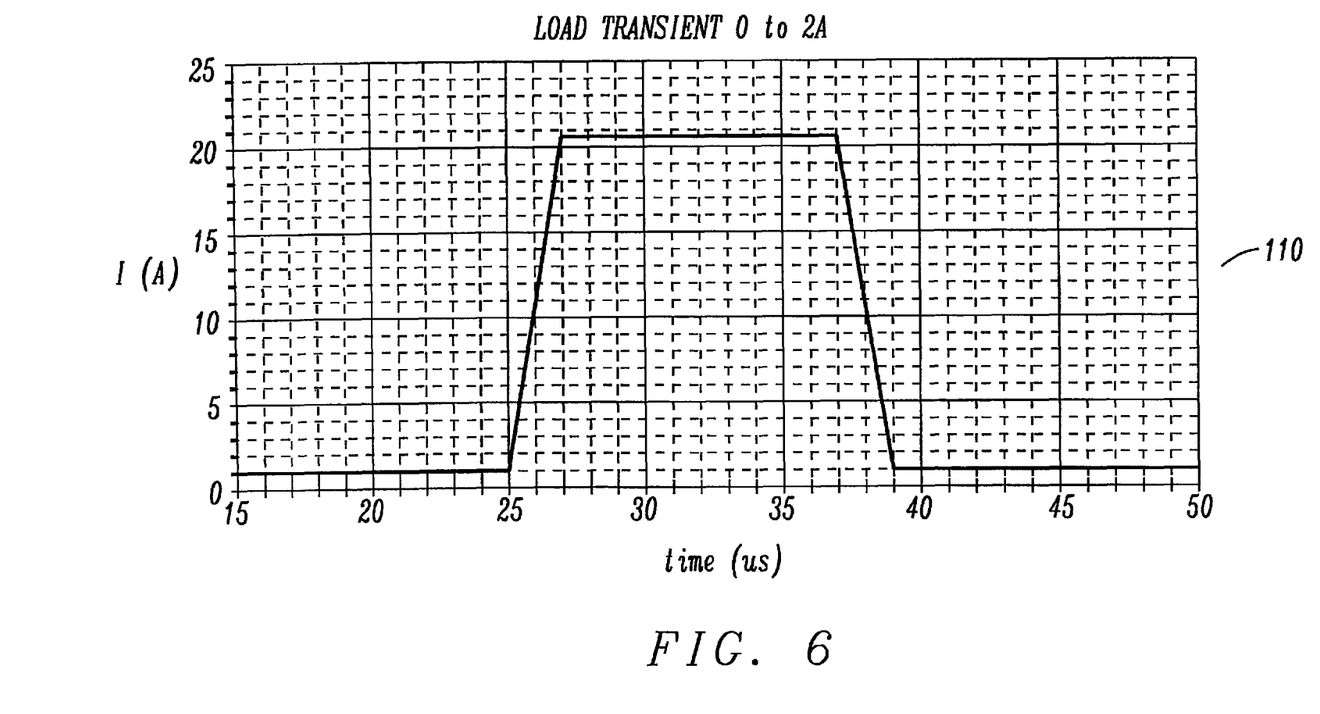
FIG. 6 is a plot highlighting a possible load current profile as a function of time for a DC-to-DC voltage regulator.

FIG. 6 is a plot highlighting a possible load current as a function of time for a DC-to-DC voltage regulator. As illustrated, a load transient current 110 is shown where the current is initially zero. The load current is ramped up from 0 to 2 A followed by a plateau, and a ramp down to the initial current condition.

Figure 7A:
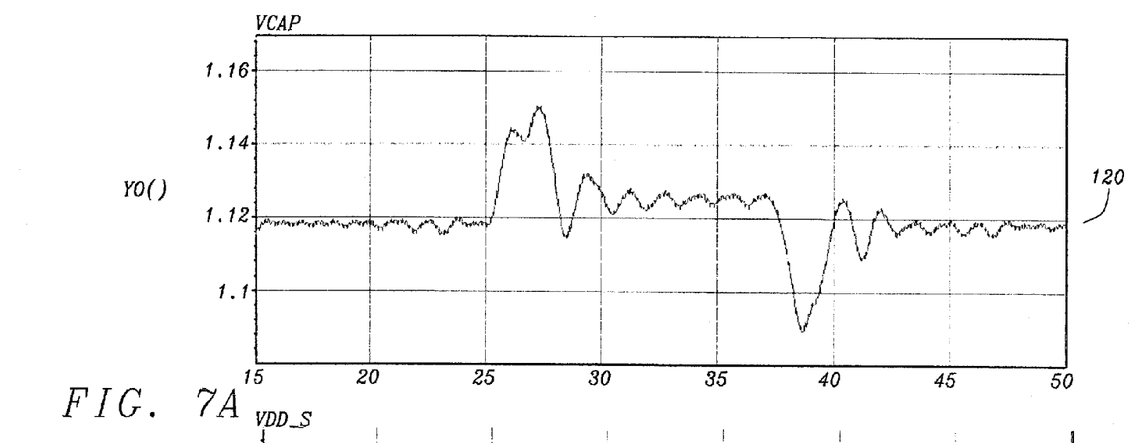
FIG. 7A is a plot highlighting the output capacitor voltage as a function of time for a DC-to-DC voltage regulator mode of operation with a remote sensing configuration without a low pass filter of a prior art embodiment. The plot is relative to the transient load as shown in FIG. 6.

FIG. 7A is a plot highlighting the output capacitor node 120 as a function of time for a DC-to-DC voltage regulator mode of operation with a remote sensing configuration without a low pass filter of a prior art embodiment. The output capacitor node is shown for the transient load as shown in FIG. 6. A transient current pulse is provided according to current waveform illustrated in FIG. 6. At a current state of zero current, the value of the output capacitor node remains at 1.12. During the load transient switch from 0 to 2 A, the output voltage rises from a positive 1.12 V to a positive 1.15 V, and demonstrates transient ringing. During the pulse plateau of constant current, transient ringing is still visible. During the load transient switch from 2 A to 0 A, the output voltage undergoes a negative transition from a positive 1.12 V to a positive 1.09 V, and demonstrates transient ringing.

Figure 7B:
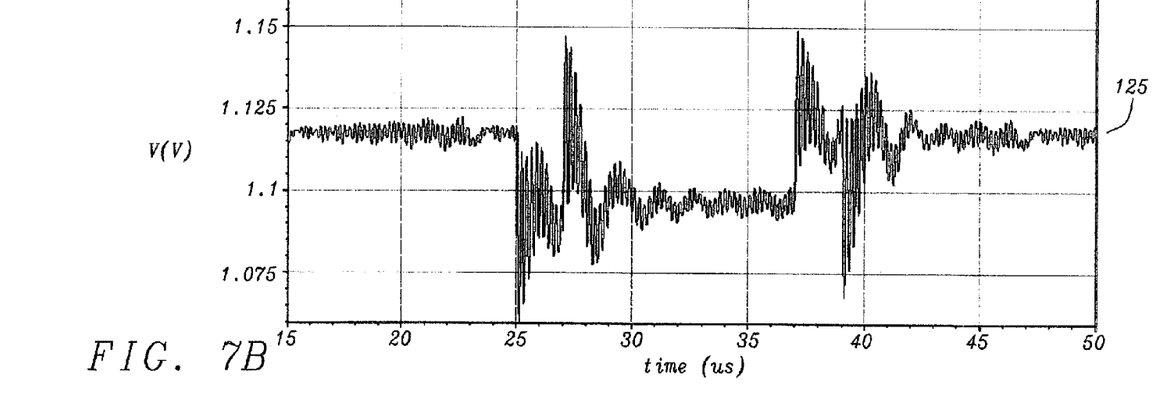
FIG. 7B is a plot highlighting the remote sense voltage as a function of time for a DC-to-DC voltage regulator mode of operation with a remote sensing configuration without a low pass filter of a prior art embodiment. The plot is relative to the transient load as shown in FIG. 6.

FIG. 7B is a plot highlighting the remote sense voltage 125 as a function of time for a DC-to-DC voltage regulator mode of operation with a remote sensing configuration without a low pass filter of a prior art embodiment. A transient current pulse is provided according to current waveform illustrated in FIG. 6. At a current state of zero current, the value of the output capacitor node remains at 1.12. During the load transient switch from 0 to 2 A, the remote sense node undergoes oscillation, and transient ringing. During the pulse plateau of constant current, transient ringing is still visible and the magnitude settles to 1.1 V. During the load transient switch from 2 A to 0 A, the output voltage undergoes both positive and negative transition and demonstrates transient ringing.

Figure 8A:
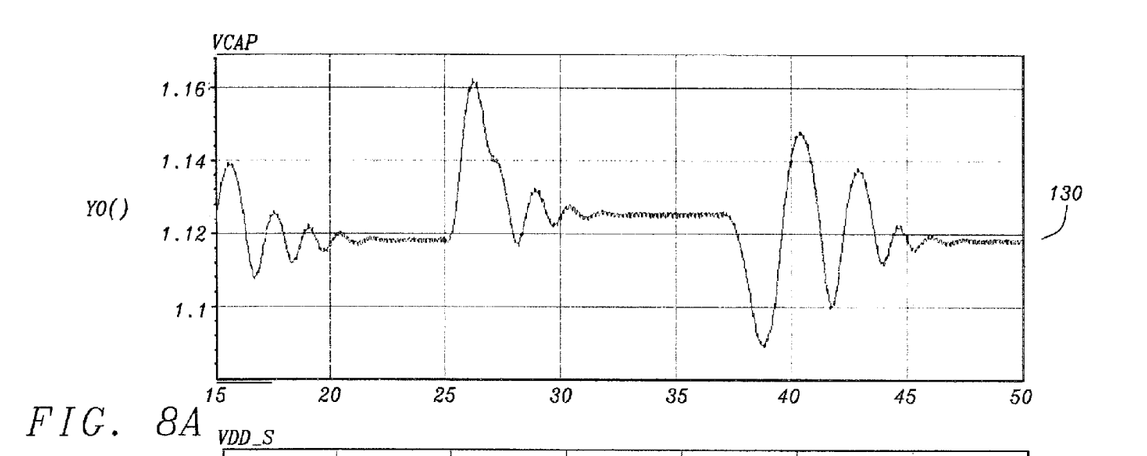
FIG. 8A is a plot highlighting the output capacitor voltage as a function of time for a DC-to-DC voltage regulator mode of operation with a remote sensing configuration with a low pass filter of a prior art embodiment. The plot is relative to the transient load as shown in FIG. 6.

FIG. 8A is a plot highlighting the output capacitor node 130, as a function of time for a DC-to-DC voltage regulator mode of operation with a remote sensing configuration with a low pass filter of a prior art embodiment. A transient current pulse is provided according to current waveform illustrated in FIG. 6. As can be observed, the introduction of the low pass filter to ground node does not eliminate the transient oscillation in the output capacitor node during load transients of ramp up, and ramp down.

Figure 8B:
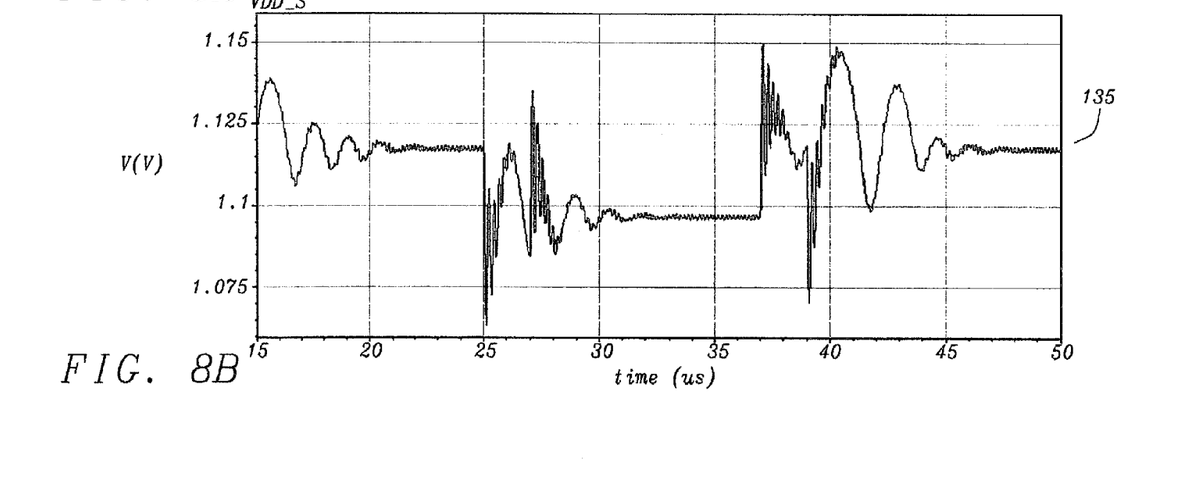
FIG. 8B is a plot highlighting the remote sense voltage as a function of time for a DC-to-DC voltage regulator mode of operation with a remote sensing configuration with a low pass filter of a prior art embodiment. The plot is relative to the transient load as shown in FIG. 6.

FIG. 8B is a plot highlighting the remote sense voltage 135 as a function of time for a DC-to-DC voltage regulator mode of operation with a remote sensing configuration with a low pass filter of a prior art embodiment. A transient current pulse is provided according to current waveform illustrated in FIG. 6. As can be observed, the introduction of the low pass filter to ground node does not eliminate the transient oscillation in the remote sense node during load transients of ramp up, and ramp down.

Figure 9A:
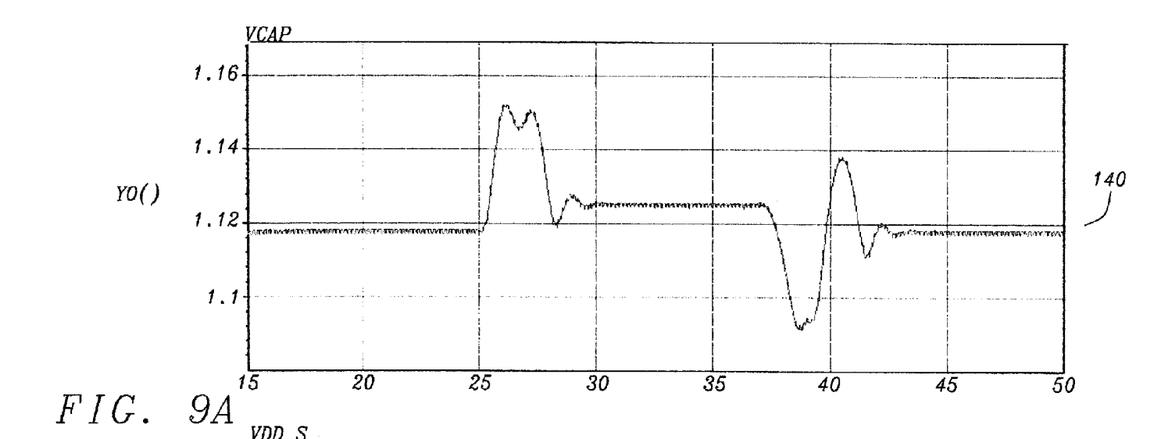
FIG. 9A is a plot highlighting the output capacitor voltage as a function of time for a DC-to-DC voltage regulator mode of operation in accordance with the first embodiment of this disclosure. The plot is relative to the transient load as shown in FIG. 6.

FIG. 9A is a plot highlighting the output capacitor node 140 as a function of time for a DC-to-DC voltage regulator mode of operation in accordance with the embodiment of this disclosure. A transient current pulse is provided according to current waveform illustrated in FIG. 6. With the low pass filter connected to the output capacitor node, the stability of the output capacitor node demonstrates significant improvement. In the waveform of the output capacitor node, there is less ringing in the steady state conditions, as well as transient periods of ramp up and ramp down transitions.

Figure 9B:
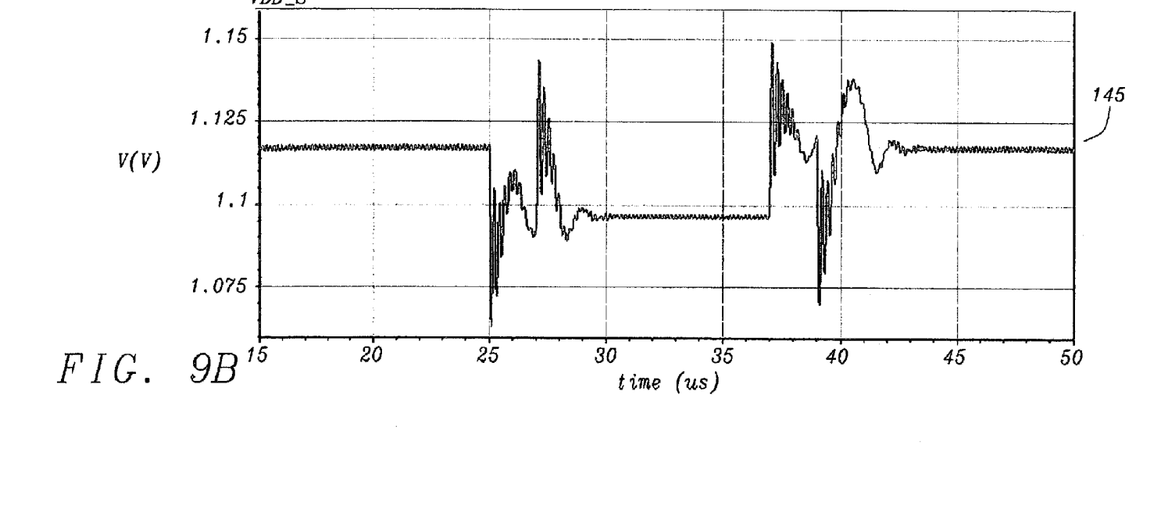
FIG. 9B is a plot highlighting the remote sense voltage as a function of time for a DC-to-DC voltage regulator mode of operation in accordance with the first embodiment of this disclosure. The plot is relative to the transient load as shown in FIG. 6.

FIG. 9B is a plot highlighting the remote sense voltage 145 as a function of time for a DC-to-DC voltage regulator mode of operation in accordance with the embodiment of this disclosure. A transient current pulse is provided according to current waveform illustrated in FIG. 6. With the low pass filter connected to the output capacitor node, the stability of the output capacitor node demonstrates significant improvement. In the waveform of the output capacitor node, there is less ringing in the steady state conditions, as well as transient periods of ramp up and ramp down transitions.

Figure 10:
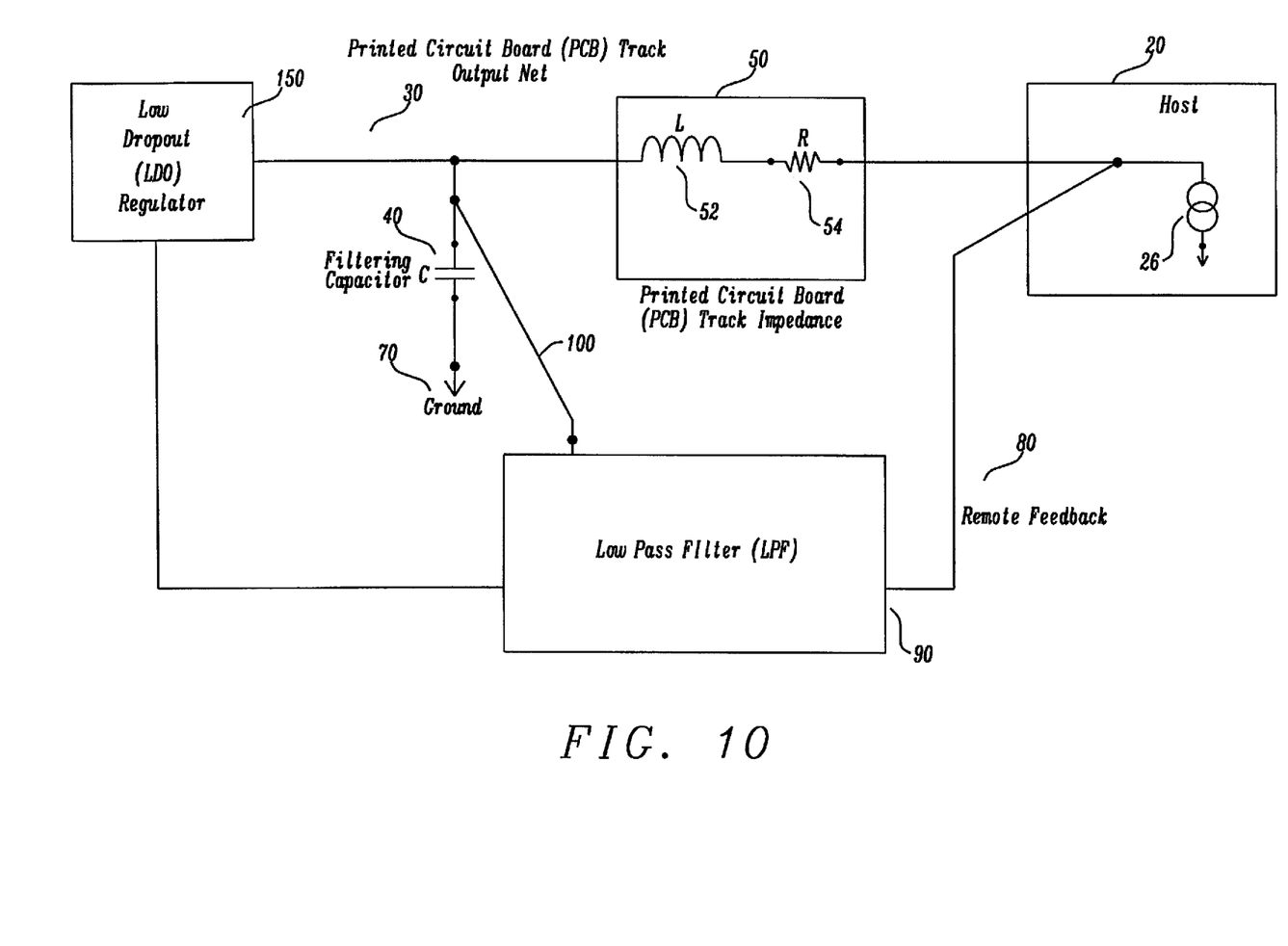
FIG. 10 is a circuit schematic illustrating a second embodiment of the present disclosure of a low dropout (LDO) regulator, a remote load (HOST), a filter capacitor, a track impedance, a remote feedback loop, a remote feedback low pass filter, and system highlighting the coupling of the remote feedback loop feedback low pass filter to the filtering capacitor and to the low dropout (LDO) regulator in accordance with the embodiment of the present disclosure.

FIG. 10 is a circuit schematic illustrating a second embodiment of the present disclosure of a low dropout (LDO) regulator 150, a remote load (HOST) 20, a filter capacitor 40, a track impedance 50, a remote feedback loop 80, a remote feedback low pass filter 90, and system highlighting the coupling of the remote feedback loop feedback low pass filter to the filtering capacitor and to the low dropout (LDO) regulator in accordance with the embodiment of the present disclosure. In this implementation, the low drop out (LDO) is provided as an example of utilization of the usage of the remote feedback loop 80, the remote feedback low pass filter 90, and its connection to output filter capacitor 40. In this implementation, the system comprises of a semiconductor chip, and a printed circuit board. The low dropout (LDO) regulator 150 can be a single semiconductor chip. The printed circuit board track 50 is on the printed circuit board. The remote feedback low pass filter 90 is also formed on the printed circuit board. Additionally, the filter can be a passive filter or an active filter.

Figure 11:
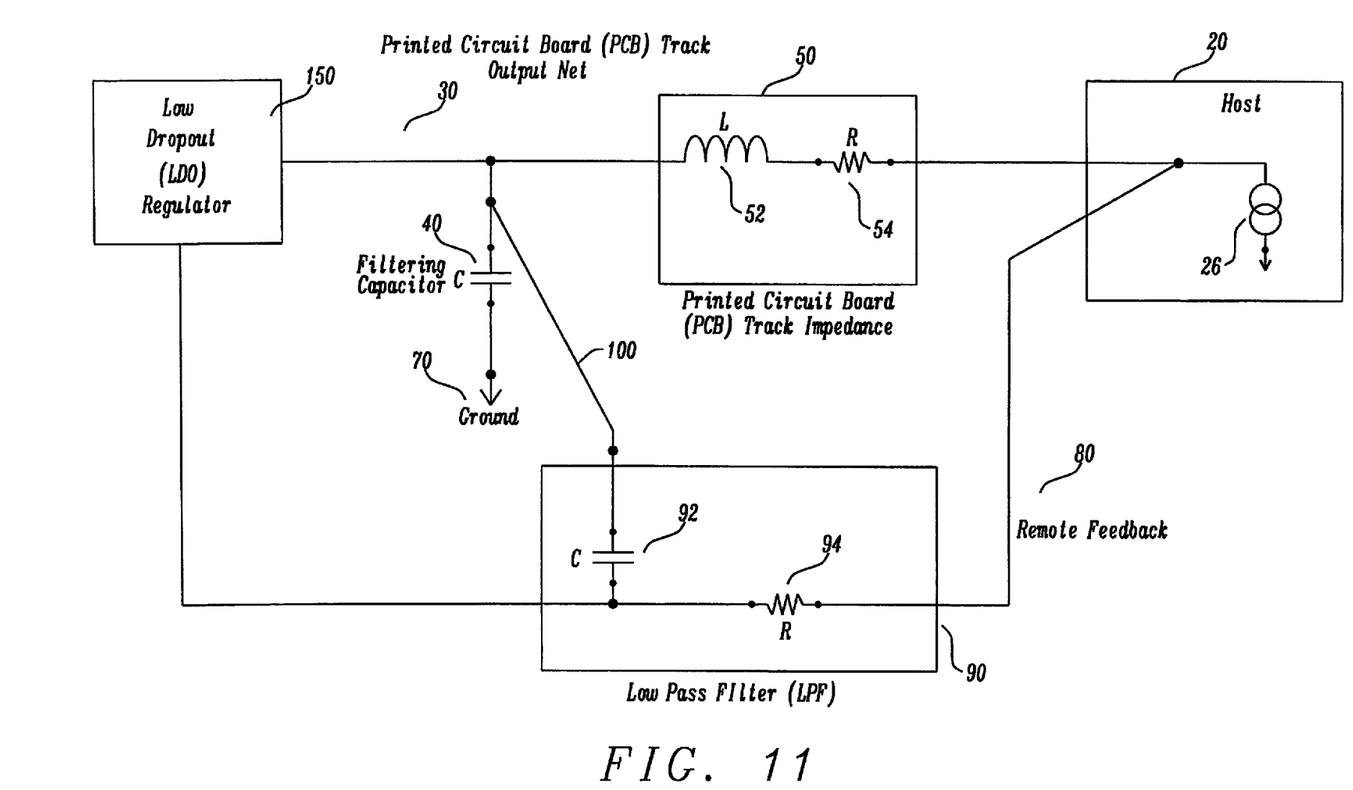
FIG. 11 is a circuit schematic illustrating a second embodiment of the present disclosure of a low dropout (LDO) regulator, a remote load (HOST), a filter capacitor, a track impedance, a remote feedback loop, a remote feedback low pass RC filter, and system highlighting the coupling of the remote feedback loop feedback low pass filter to the filtering capacitor and to the low dropout (LDO) regulator in accordance with the embodiment of the present disclosure.

FIG. 11 is a circuit schematic illustrating a second embodiment of the present disclosure of a low dropout (LDO) regulator 150, a remote load (HOST) 20, a filter capacitor 40, a track impedance 50, a remote feedback loop 80, a remote feedback low pass RC filter 90, and system highlighting the coupling of the remote feedback loop feedback low pass filter to the filtering capacitor and to the low dropout (LDO) regulator in accordance with the embodiment of the present disclosure. In this implementation, the system comprises of a semiconductor chip, and a printed circuit board. The low dropout (LDO) regulator 150 can be a single semiconductor chip. The printed circuit board track 50 is on the printed circuit board. The remote feedback low pass filter 90 is also formed on the printed circuit board.

Figure 12:
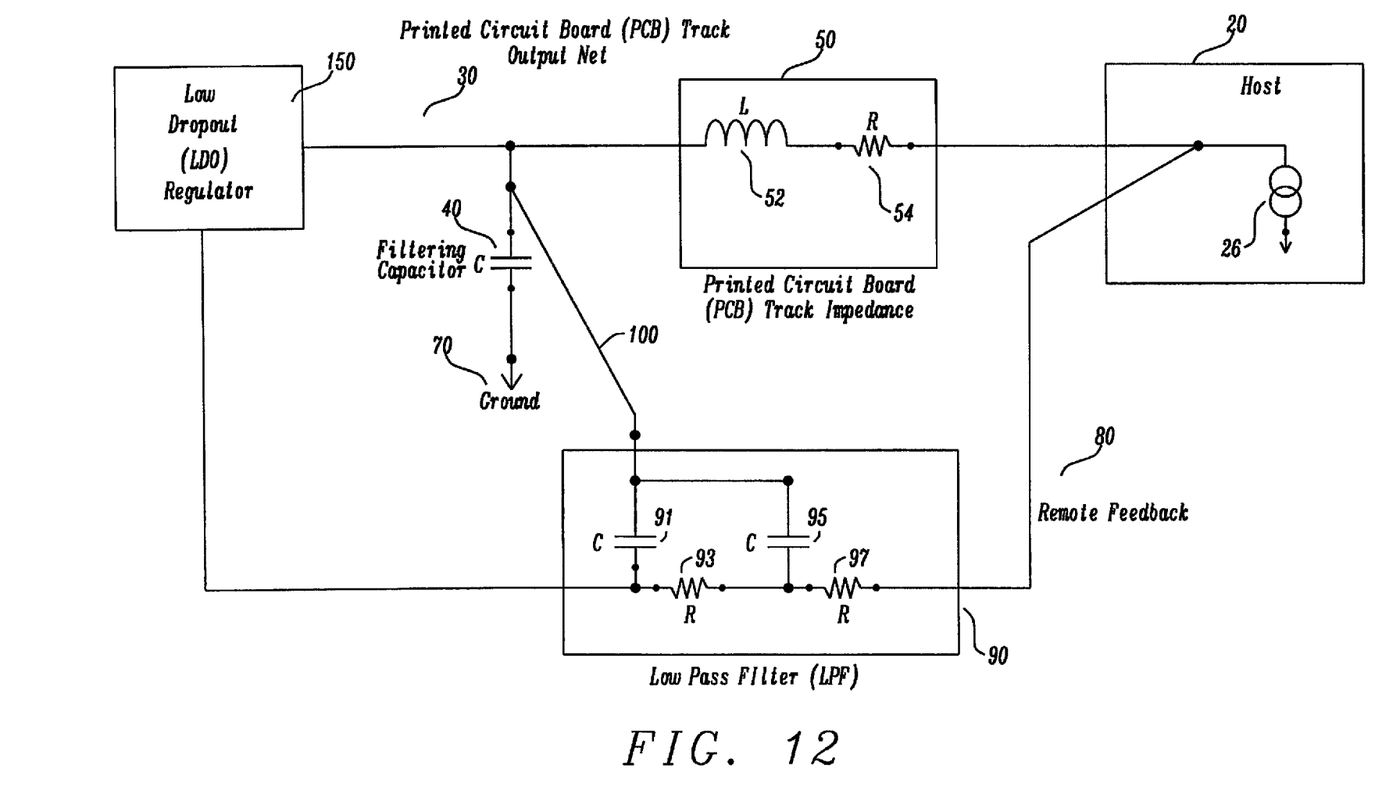
FIG. 12 is a circuit schematic illustrating a second embodiment of the present disclosure of a low dropout (LDO) regulator, a remote load (HOST), a filter capacitor, a track impedance, a remote feedback loop, a remote feedback low pass filter containing a plurality of RC elements, and system highlighting the coupling of the remote feedback loop feedback low pass filter to the filtering capacitor and to the low dropout (LDO) regulator in accordance with the embodiment of the present disclosure.

FIG. 12 is a circuit schematic illustrating a second embodiment of the present disclosure of a low dropout (LDO) regulator 150, a remote load (HOST) 20, a filter capacitor 40, a printed circuit board (PCB) track impedance 50, a remote feedback loop 80, a remote feedback low pass filter 90 containing a plurality of RC elements, and system highlighting the coupling of the remote feedback loop feedback low pass filter to the filtering capacitor and to the low dropout (LDO) regulator in accordance with the embodiment of the present disclosure. The low pass filter can consist of at least one resistor, and at least one capacitor. As illustrated in FIG. 12, a low pass filter can comprise of a capacitor 91, a resistor 93, a capacitor 95, and resistor 97. The first capacitor 91 is connected to the filtering capacitor 40, whereas the second capacitor 95 is connected to ground. The filter can also consist of either active or passive filter elements that provide a function of a low pass filter. In this implementation, the system comprises of a semiconductor chip, and a printed circuit board. The low dropout (LDO) regulator 150 can be a single semiconductor chip. The printed circuit board track 50 is on the printed circuit board. The remote feedback low pass filter 90 is also formed on the printed circuit board. The remote feedback loop low pass filter 90 can be a plurality of capacitors and a plurality of resistors that are mounted on a printed circuit board.

Figure 13:
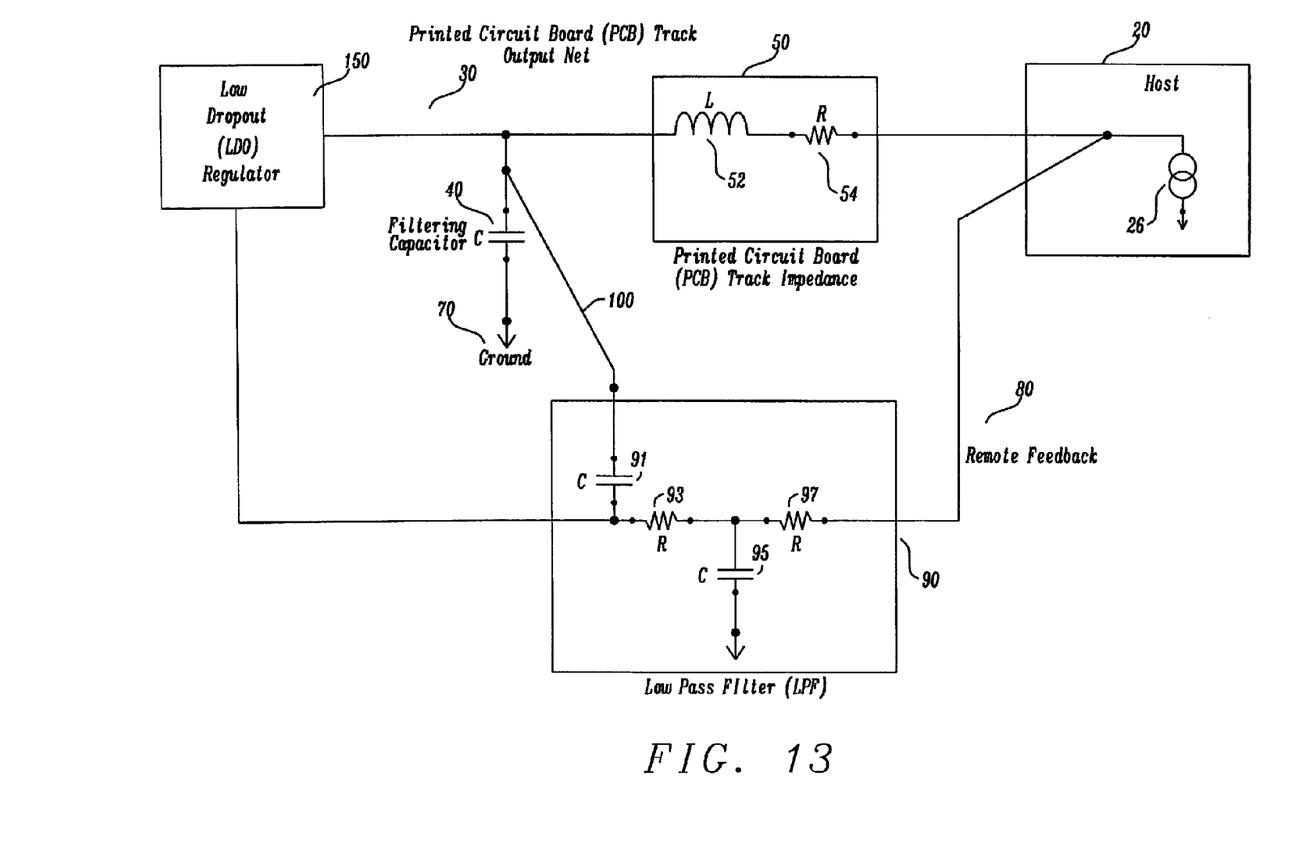
FIG. 13 is a circuit schematic illustrating a third embodiment of the present disclosure of a low dropout (LDO) regulator, a remote load (HOST), a filter capacitor, a track impedance, a remote feedback loop, a remote feedback low pass filter containing a plurality of RC elements, where the first capacitor is connected to the filter capacitor, and the second is connected to ground in accordance with the embodiment of the present disclosure; and, FIG. 14 is a method of providing system stability in a voltage regulator circuit in accordance with the embodiment of this disclosure.

FIG. 13 is a circuit schematic illustrating a second embodiment of the present disclosure of a low dropout (LDO) regulator 150, a remote load (HOST) 20, a filter capacitor 40, a printed circuit board (PCB) track impedance 50, a remote feedback loop 80, a remote feedback low pass filter 90 containing a plurality of RC elements, and system highlighting the coupling of the remote feedback loop feedback low pass filter to the filtering capacitor and to the low dropout (LDO) regulator in accordance with the embodiment of the present disclosure. The low pass filter can consist of at least one resistor, and at least one capacitor. As illustrated in FIG. 12, a low pass filter can comprise of a capacitor 91, a resistor 93, a capacitor 95, and resistor 97. In this implementation, the system comprises of a semiconductor chip, and a printed circuit board. The low dropout (LDO) regulator 150 can be a single semiconductor chip. The printed circuit board track 50 is on the printed circuit board. The remote feedback low pass filter 90 is also formed on the printed circuit board. The remote feedback loop low pass filter 90 can be a plurality of capacitors and a plurality of resistors that are mounted on a printed circuit board. The low pass filter can consist of resistor, capacitor and inductor elements that provide a low pass function, in RC, RL, LC, and RLC combinations that improve the noise and stability on the remote feedback loop. Additionally, the filter can be a passive filter or an active filter that provide the function of a low pass filter.

Figure 14:
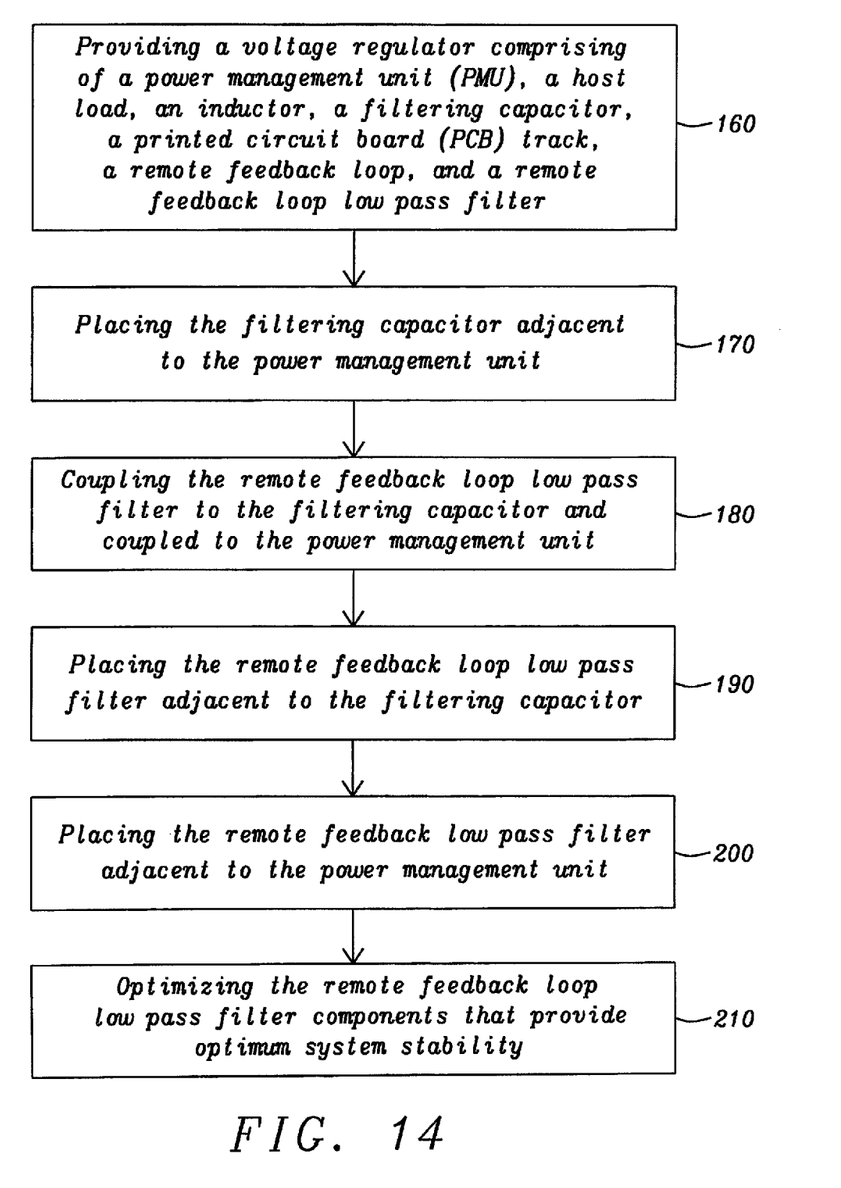

FIG. 14 is a method of providing system stability in a voltage regulator circuit in accordance with the embodiment of this disclosure. In FIG. 14, the method is illustrated with a method of providing system stability in a voltage regulator circuit comprising of the following steps, (1) providing a voltage regulator comprising of a power management unit (PMU), a host load, an inductor, a filtering capacitor, a printed circuit board (PCB) track, a remote feedback loop, and remote feedback loop low pass filter 160, (2) placing the filtering capacitor adjacent to the power management unit (PMU) 170, (3) coupling the remote feedback loop low pass filter to the filtering capacitor, and coupled to the power management unit 180, (4) placing the remote feedback loop low pass filter adjacent to the filtering capacitor 190, (5) placing the remote feedback loop low pass filter adjacent to the power management unit (PMU) 200, and (6) optimizing the remote feedback loop low pass filter components that provides optimum system stability 210.

As such, an apparatus, system and method are herein described. The apparatus provides improved voltage regulation. The apparatus, system, and method demonstrates minimizing of transient ringing. Additionally, the apparatus demonstrates improved system stability, The improvement is achieved with the introduction of a remote feedback loop, a remote feedback loop low pass filter, and its electrical connection to the output capacitor. Other advantages will be recognized by those of ordinary skill in the art. The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:
1. A voltage regulator with improved voltage regulation comprising:
   a power management unit (PMU);
   a remote load;
   a remote feedback network electrically connected to said remote load and whose output is electrically coupled to said power management unit PMU;
   a printed circuit board (PCB) comprising at least one said printed circuit board (PCB) trace electrically coupling said power management unit (PMU) and said remote load;
   a filtering capacitor; and
   a remote feedback loop filter electrically coupled to said filtering capacitor and to said power management unit PMU.

2. The voltage regulator of claim 1 wherein said remote feedback loop filter is an active or passive filter.

3. The voltage regulator of claim 2 wherein said remote feedback loop filter is a low pass filter.

4. The voltage regulator of claim 3 wherein said low pass filter comprises:
   at least one capacitor; and
   at least one resistor.

5. The voltage regulator of claim 3 wherein said low pass filter comprises:
   a plurality of capacitors; and
   a plurality of resistors.

6. The voltage regulator of claim 3 wherein said low pass filter with the plurality of capacitors and plurality of resistors where at least one capacitor is connected to said filter capacitor, and at least one capacitor is connected to ground.

7. The voltage regulator of claim 3 wherein said low pass filter is electrically connected to said power management unit PMU and said filtering capacitor.

8. A system with improved electrical stability, comprising:
   a printed circuit board (PCB);
   a power management device;
   a remote load;
   at least one printed circuit board (PCB) track on said printed circuit board (PCB) electrically coupling said power management device and said remote load;
   a filter capacitor electrically connected to said printed circuit board (PCB) track and electrical ground;
   a remote feedback line electrically coupling said power management device and said remote load; and
   a remote feedback loop filter electrically coupled to said power management device and filter capacitor to minimize non-ideal characteristics of said printed circuit board (PCB) track.

9. The system with of claim 8 wherein said remote feedback loop filter is a passive or active filter.

10. The system of claim 9 wherein said remote feedback loop filter is electrically mounted on the same substrate as the power management device.

11. The system of claim 10 wherein said remote feedback loop filter is mounted on said printed circuit board (PCB).

12. The system of claim 11 wherein said remote feedback loop filter is a low pass filter.

13. The system with of claim 12 wherein said low pass filter is at least one resistor, and at least one capacitor.

14. The system of claim 12 wherein said low pass filter is a plurality of resistors and plurality of capacitors.

15. A method for improved voltage regulation using a remote feedback and remote feedback low pass filter, comprising the steps of:
   providing a voltage regulator comprising of a power management unit (PMU), a host load, an inductor, a filtering capacitor, a printed circuit board (PCB) track, a remote feedback loop, and remote feedback loop low pass filter;
   placing the filtering capacitor adjacent to the power management unit (PMU); and
   coupling the remote feedback loop low pass filter to the filtering capacitor, and to the power management unit (PMU) for minimizing non-ideality characteristics of said printed circuit board (PCB) track.

16. The method of claim 15 further comprising placing the remote feedback loop low pass filter adjacent to the filtering capacitor.

17. The method of claim 16 further comprising placing the remote feedback loop low pass filter adjacent to the power management unit (PMU).

18. The method of claim 17 further comprising optimizing the remote feedback loop low pass filter components that provides optimum system stability.

19. The voltage regulator of claim 1 wherein said voltage regulator is a DC-to-DC voltage regulator.

20. The voltage regulator of claim 1 wherein said voltage regulator is a low dropout (LDO) regulator.

21. The voltage regulator of claim 19 wherein said DC-to-DC voltage regulator is a buck converter, boost converter, buck-buck converter, or buck-boost regulator.

22. The system of claim 8 wherein said power management device is a DC-to-DC voltage regulator.

23. The system of claim 8 wherein said power management device is a low dropout (LDO) regulator.

24. The system of claim 22 wherein said DC-to-DC voltage regulator is a buck converter, boost converter, buck-buck converter, or buck-boost regulator.

25. The method of claim 15 wherein said voltage regulator is a DC-to-DC voltage regulator.

26. The method of claim 15 wherein said voltage regulator is a low dropout (LDO) regulator.

27. The voltage regulator of claim 25 wherein said DC-to-DC voltage regulator is a buck converter, boost converter, buck-buck converter, or buck-boost regulator.

* * * * *